Dec. 17, 1929.  W. H. SCHMITT  1,740,042
COVER HOLDER FOR COOKING UTENSILS

Filed Nov. 25, 1927

INVENTOR:
William H. Schmitt
David E. Carlsen
ATTORNEY.

Patented Dec. 17, 1929

1,740,042

UNITED STATES PATENT OFFICE

WILLIAM H. SCHMITT, OF ST. PAUL, MINNESOTA

COVER HOLDER FOR COOKING UTENSILS

Application filed November 25, 1927. Serial No. 235,516.

My invention relates to improvements in lid devices for cooking utensils and the main object is to provide a cover for stew pan or like utensil, said cover having new features of construction to hold it securely in place concentric of the utensil opening and other objects hereinafter fully set forth reference being had to the accompanying drawing, in which,—

Figure 1:
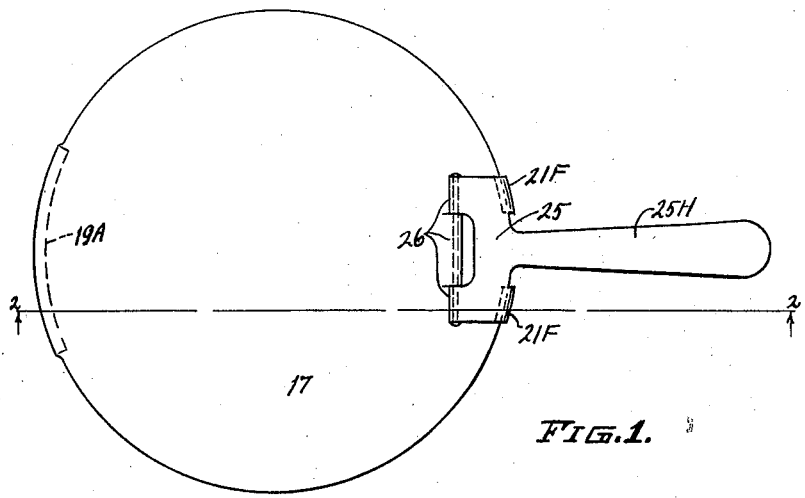
Fig. 1 is a top view of my improved utensil cover.

Referring to the drawing by reference numerals, 15 designates a cooking utensil of the type generally having an outward beaded rim 15R at its opening.

17 is a sheet metal stew-pan cover usually of a diameter to correspond to the outside diameter of the bead of the pan opening and adapted to lie thereon concentrically to cover the pan and its contents.

19A is an integral flange part of the cover 17, at its front edge, comprising an arcuate flange opening inwardly being bent down from the top plane of the lid, thence inwardly, said flange adapted to engage the outer and under areas of the bead 15R. Approximately diametrically opposite this flange 19A is provided other bead engaging means shown as two downward and inwardly directed short flanges 21F comprising a part of a plate 25 hinged transversely and on top of the cover as at 26, said plate having an integral handle 25H extending outwardly radially from the cover and preferably in a slightly upward incline from plate 25, as shown in Fig. 2.

The flange parts 21F are merely sprung into or out of engagement with the bead of the stew-pan when handle 25H and its plate 25 are swung down or up to engage or disengage the pan.

Figure 2:
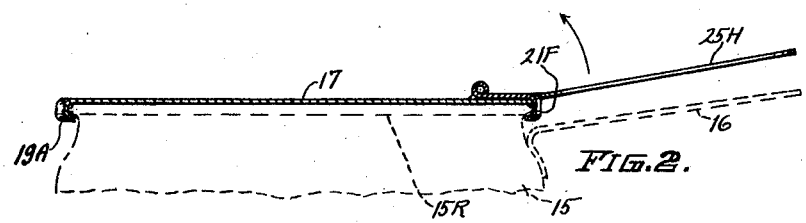
Fig. 2 is a longitudinal sectional elevation as on line 2—2 in Fig. 1 and including, in dotted lines, the upper portion of a stew pan or like utensil in which my device is applied.

16 is the handle of a stew-pan projecting radially from it and about as shown in Fig. 2. In the use of my device its handle, when in lowered position as shown, should be above the handle 16. When a stew-pan, with my improved cover thus applied on it, is to be handled the operator merely grasps the two parallel handles and the stew-pan together with the cover are readily moved or lifted as desired. The use of my device is now fully disclosed. The flange devices providing head engaging means at three places on the pan bead holds the cover concentric and rigidly and more so when the handles are grasped as described.

I claim:

In a cover of the class described, for a cooking utensil with a perimetral bead at its opening, said cover formed with a front arcuate bead engaging flange comprising a portion of the cover metal bent downwardly thence inwardly, a handle hinged on said cover diametrically opposite said front flange part, said handle comprising a plate hinged transversely on top of the cover inwardly of its perimeter, an integral handle extending from said plate opposite its hinged part, bead engaging flanges formed of the rear part of said plate one at each side of its handle, each of said latter flanges being bent downwardly and thence inwardly in such spaced relation to the said front flange to cause said pair of flanges to frictionally engage the bead of the utensil when the front flange is engaged by the front part of the cover and when said handle is swung outwardly and down toward a common plane with the cover.

In testimony whereof I affix my signature.

WILLIAM H. SCHMITT.